(12) United States Patent
Hashimoto

(10) Patent No.: US 6,639,877 B2
(45) Date of Patent: Oct. 28, 2003

(54) INFORMATION RECORDING AND REPRODUCING APPARATUS, AND CONTROL METHOD THEREOF

(75) Inventor: Atsushi Hashimoto, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 49 days.

(21) Appl. No.: 10/094,654

(22) Filed: Mar. 12, 2002

(65) Prior Publication Data
US 2002/0131334 A1 Sep. 19, 2002

(30) Foreign Application Priority Data
Mar. 14, 2001 (JP) ......................................... 2001-072245

(51) Int. Cl.⁷ .......................... G11B 21/08; H04N 5/191
(52) U.S. Cl. ................. 369/30.24; 369/30.36; 386/95
(58) Field of Search .................. 369/30.24, 30.23, 369/30.26, 30.11, 47.11, 53.22, 44.26, 275.3, 30.04, 53.45, 30.36; 386/126, 125, 95

(56) References Cited

U.S. PATENT DOCUMENTS

| 5,463,605 A | * | 10/1995 | Nishida et al. ........... 369/30.36 |
| 5,974,008 A | * | 10/1999 | Lee ........................... 369/30.36 |
| 6,249,499 B1 | * | 6/2001 | Andoh ...................... 369/53.22 |
| 6,388,960 B1 | * | 5/2002 | Furukawa et al. ........ 369/30.24 |
| 6,393,201 B1 | * | 5/2002 | Sakuramoto et al. ......... 386/95 |

* cited by examiner

Primary Examiner—Ali Neyzari
(74) Attorney, Agent, or Firm—Wenderoth, Lind & Ponack, L.L.P.

(57) ABSTRACT

An information recording and reproducing apparatus includes a record and reproduce section to record or reproduce information signal onto or from an information medium, a determination section to determine at least one of a kind and a state of the medium, a function management section to manage functions for recording and functions for reproduction, and to select functions which can be performed from the managed functions according to the determination result of the determination section, and a display control section to control a display unit to display a list of functions selected by the function management section.

12 Claims, 5 Drawing Sheets

INFORMATION RECORDING AND REPRODUCING APPARATUS, AND CONTROL METHOD THEREOF

BACKGROUND OF THE INVENTION (1. Technical Field of the Invention)

The present invention relates to an apparatus for recording and reproducing several kinds of information media such as a readable and recordable type medium or a read only type medium.

(2. Related Art)

In order to reproduce several kinds of media, it needs to be equipped with functions of recording or reproducing for all kinds of media. The information recording and reproducing apparatus in prior art is described below with reference to FIG. 5. Referring to FIG. 5, a medium determination section 504 examines a presence or a kind of the medium loaded in a drive 105, and transfers information regarding the kind of the medium to a function management section 502. When a user pushes a button corresponding to a recording function or a reproducing function on an input unit 501 such as a remote control unit, a request of the function corresponding to the pushed button is transferred to the function management section 502. If the requested function is performable to a medium with the kind of the loaded medium, the function management section 502 transfers the function request to a function performance section 103 according to information from the input unit 501 and the medium determination unit 504. According to an instruction from the function performance section 103, a recording and reproducing section 108 performs a recording function or a reproducing function which is requested by the user.

For example, when a disc having DVD-RAM format (DVD-RAM disc) is loaded to the drive 105, the medium determination section 504 performs a determination of a kind of the medium, that is, determines that a treatable DVD-RAM disc has been loaded, based on the facts that the loaded disc is a DVD-RAM medium and that logical structure of the DVD-RAM medium is conformable to DVD Video Recording format. The information relating to the determination result is transferred to the function management section 502. When the user pushes a button of "DIRECT NAVIGATOR" function on the input unit 501, a request for performing the function corresponding to the pushed button is transferred to the function management section 502. The function management section 502 determines whether the DIRECT NAVIGATOR function is available as a function to the DVD-RAM disc. The DIRECT NAVIGATOR function is available to the DVD-RAM disc, and thus a request for the DIRECT NAVIGATOR function is transferred to the function performance section 103. According to the request, the function performance section 103 reproduces data for the DIRECT NAVIGATOR function to the DVD-RAM disc, and sends a request for presenting the DIRECT NAVIGATOR screen to the display unit 107.

When a disc having DVD-Video format (DVD-Video disc) is loaded to the drive 105, the medium determination section 504 similarly performs a determination of a kind of the medium, that is, determines that DVD-Video disc has been loaded, based on the facts that the loaded disc is a DVD-ROM medium and that logical structure of the DVD-ROM medium is conformable to DVD-Video format. The information regarding the determination result is transferred to the function management section 502. Similar to the above-described case, when the user pushes a button of "DIRECT NAVIGATOR" on the input unit 501, a request for the function corresponding to the pushed button is transferred to the function management section 502. The function management section 502 determines whether the DIRECT NAVIGATOR function is available as a function to the DVD-Video disc. Since the DIRECT NAVIGATOR function is not available to the DVD-Video disc, the function management section 502 does not transfer the request to the function performance section 103.

In the information recording and reproducing apparatus to record or reproduce several kinds of media as described above, available or performable functions are different depending on kinds of the media. Therefore, the input unit 501 such as the remote control unit as shown in FIG. 5 has to be equipped with some operation buttons provided for each function. Further, since the DIRECT NAVIGATOR function is not available to the DVD-Video disc as described above, the user has to recognize available functions corresponding to kinds of the media, and select and use the operation buttons.

SUMMARY OF THE INVENTION

The present invention is directed to enable the user to perform easily a desired function without buttons is provided on the input section such as a remote controller unit and provided for every function depending on a kind of the medium, even when the user does not recognize functions which can be performed depending on a kind or a state of the medium.

In a first aspect of the invention, provided is an information recording and reproducing apparatus which records or reproduces information signal onto or from an information medium. The apparatus includes a determination section, a function management section, a function selecting section, and a display control section. The function management section manages one or more of functions available to each kind or state of the medium. The determination section determines at least one of a kind and a state of-the medium. The function selecting section selects functions which can be performed from the managed functions according to the determination result of the determination section. The display control section generates data for displaying a list of functions selected by the function selecting section.

The function management section may manage functions which can be performed regardless of the kind of the medium.

The display control section may control the display unit to display distinctively the function which can be performed according to the state of the medium and the function which can not be performed according to the state of the medium.

The apparatus may further include a section to determine a state of the apparatus. The display control section may control the display unit to display distinctively the function which can be performed according to the state of the apparatus and the function which can not be performed according to the state of the apparatus.

A button for the function available in common with all kinds of media may be disposed at the same position on the list of functions despite of the kind or the state of the medium.

A button for the function having a high frequency of use may be disposed in the vicinity of the center of the list of functions.

In a second aspect of the invention, provided is a method of controlling an information recording and reproducing apparatus which records or reproduces information signal onto or from an information medium. The method includes managing functions for recording and functions for reproduction, determining at least one of a kind and a state of the medium, selecting functions which can be performed from the managed functions according to the determination result, and controlling a display unit to display a list of selected functions.

According to the present invention, a list screen of functions of the information recording and reproducing apparatus is displayed, in which the function can be performed by user's pushing the button displayed on the screen via the input section such as the remote control unit. Thus it does not need to provide dedicated buttons for functions on the input unit such as the remote control unit, resulting in reduction of buttons on the input unit. Further, functions are listed and displayed according to a kind of the medium (such as recordable and readable type medium, or read only type medium), a state of the medium (such as a presence of format, or write protection), or a state of the apparatus, thereby a desired function can be performed by selecting the available item. Thus, the user can easily use the information recording and reproducing apparatus, and easily perform a desired function.

DETAILED DESCRIPTION OF THE PREFERRED EMBODIMENTS

Figure 1:
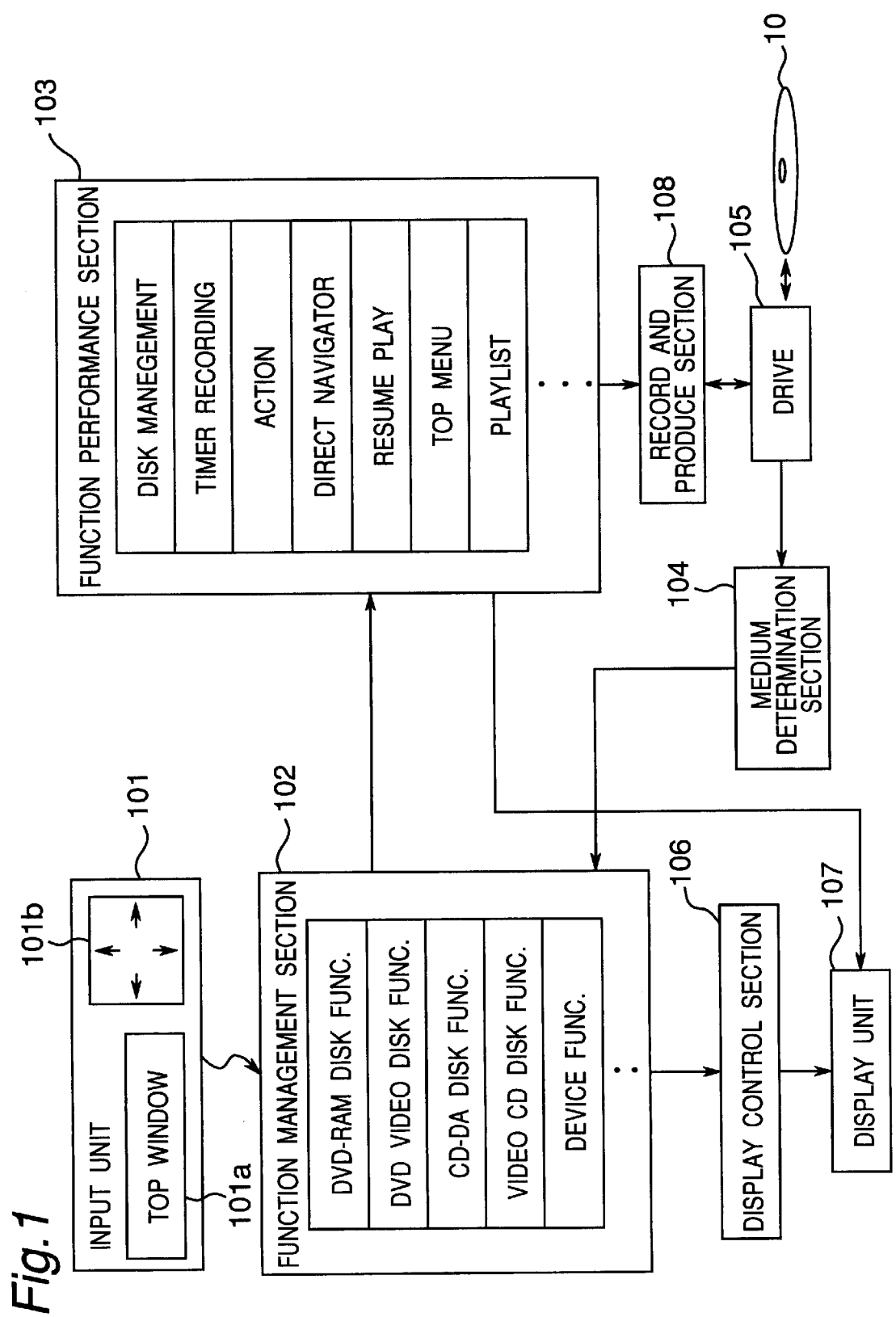
FIG. 1 is a block diagram of an information recording and reproducing apparatus according to the embodiment of the invention.
Figure 2:
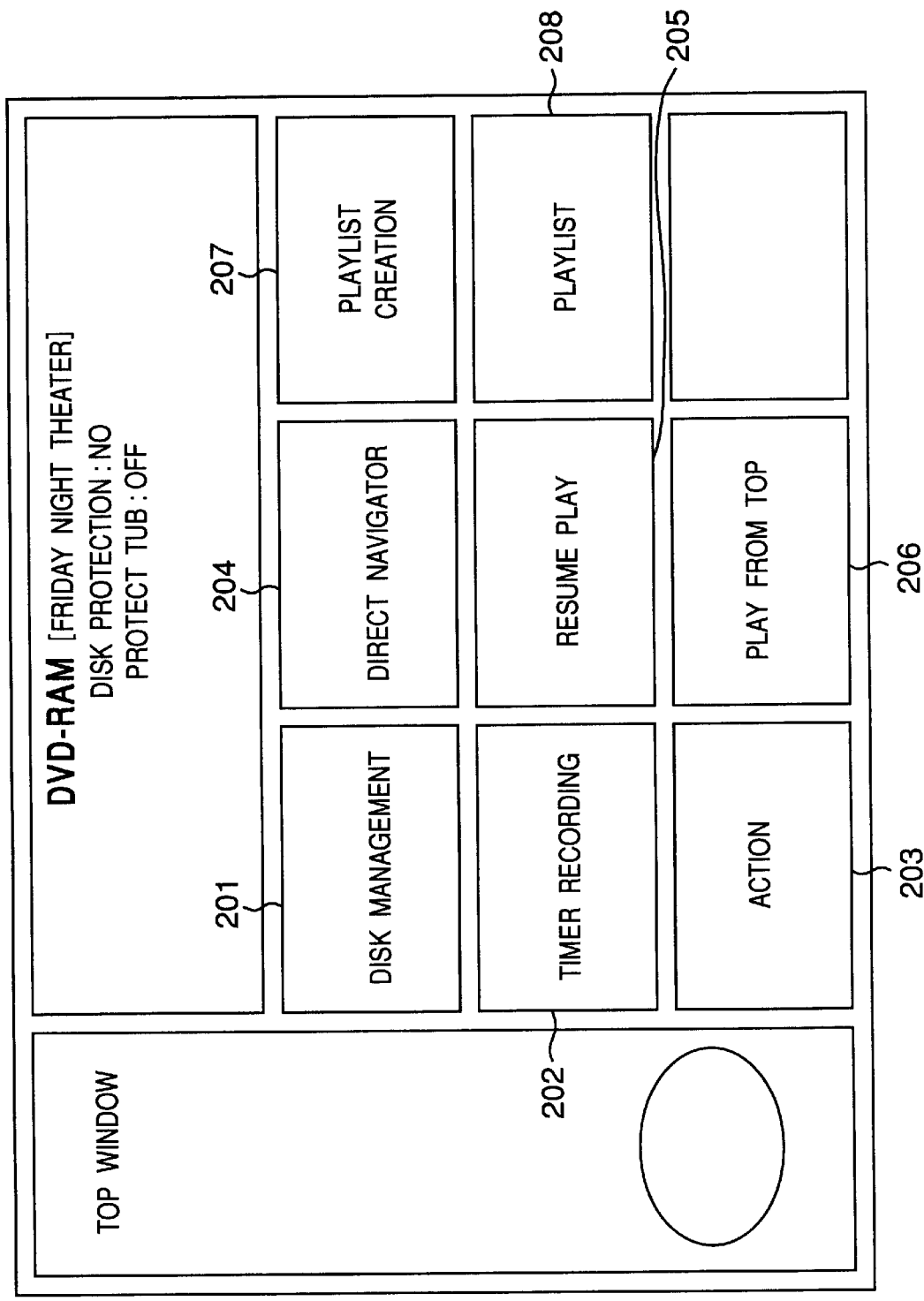
FIG. 2 is a illustrative view showing an example display of the invention displayed on the screen when the disc loaded to the drive is DVD-RAM disc.
Figure 3:
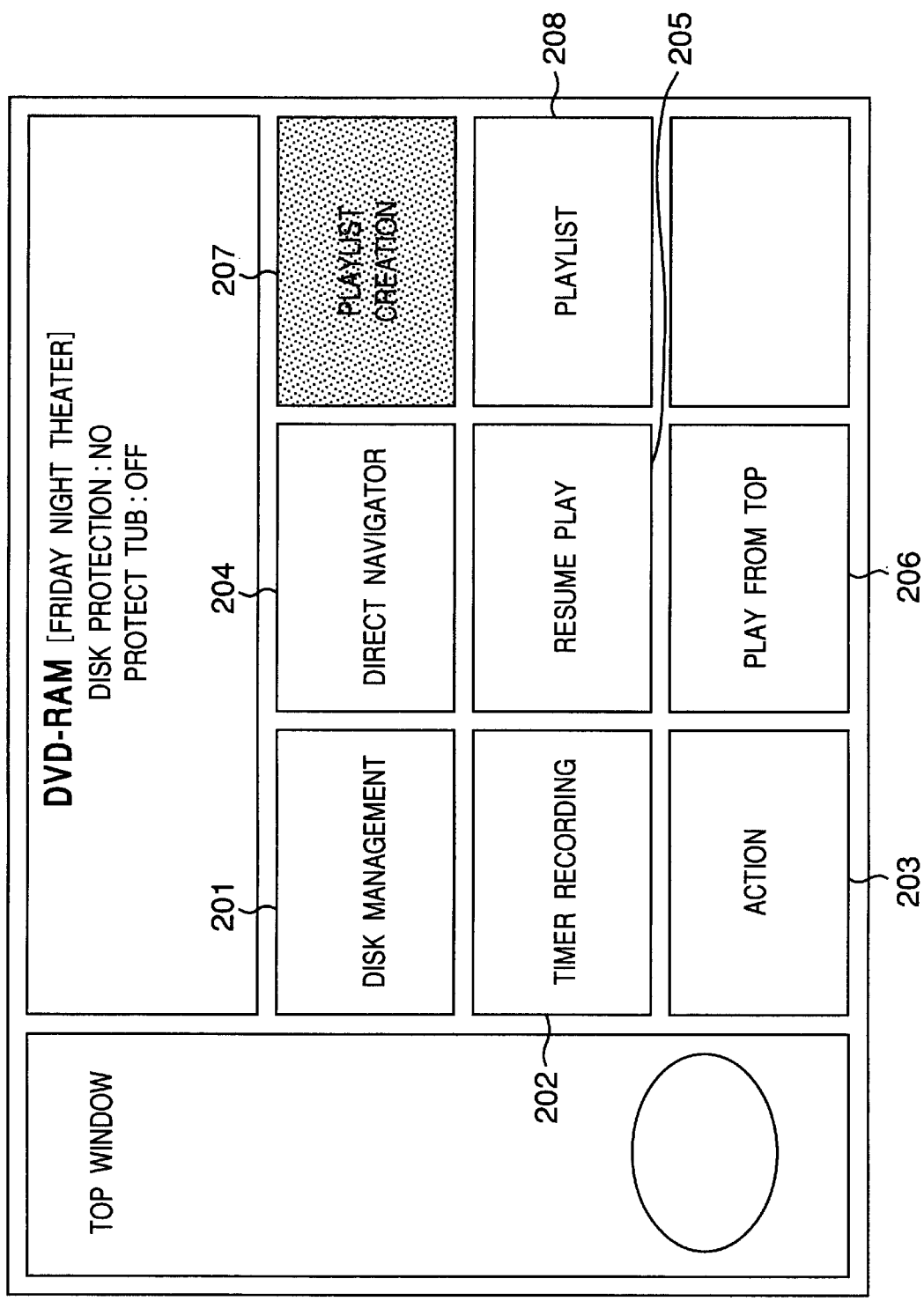
FIG. 3 is a illustrative view showing an example display of the invention displayed on the screen when the disc loaded to the drive is DVD-RAM disc which is under write protection.
Figure 4:
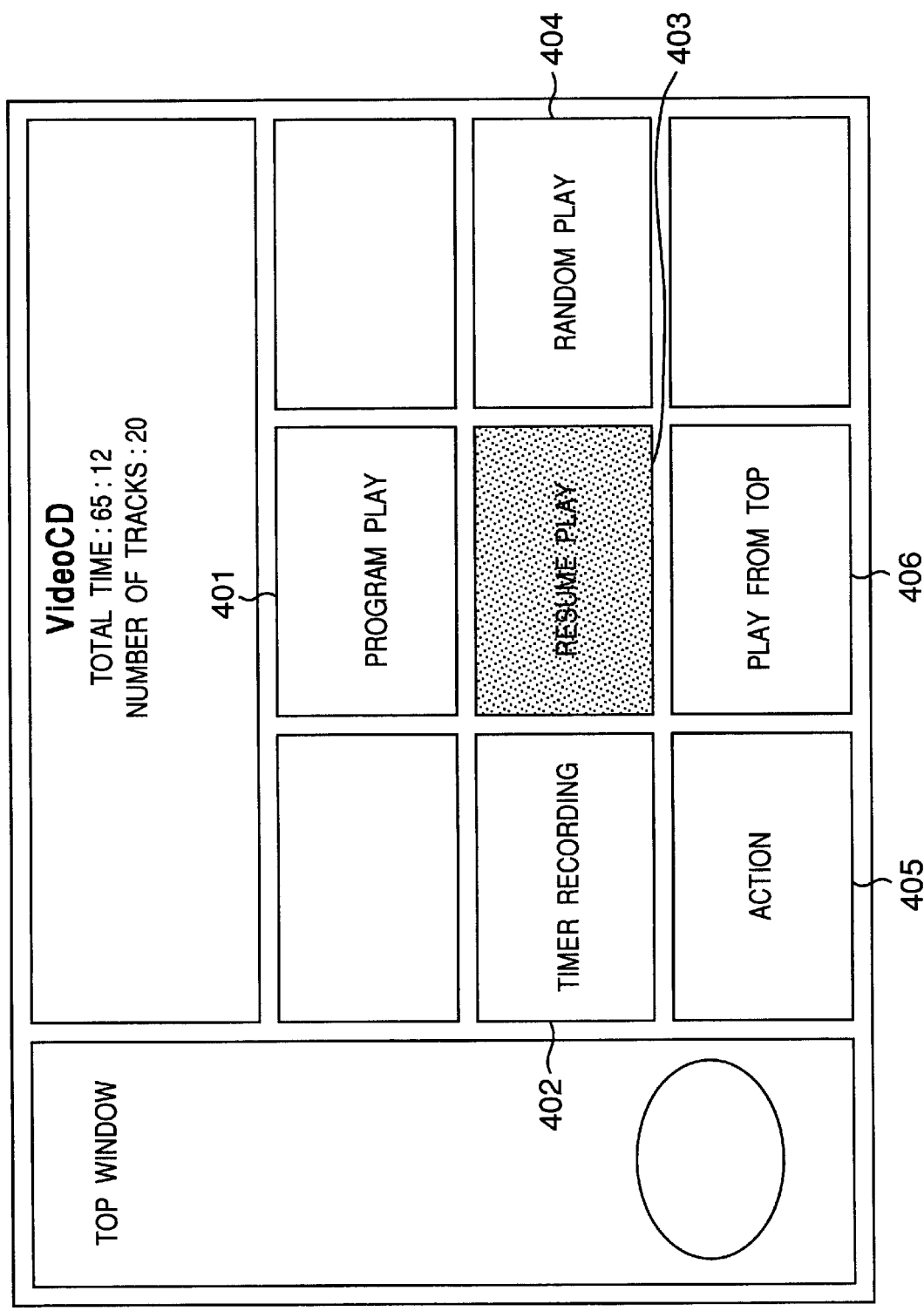
FIG. 4 is a illustrative view showing an example display of the invention displayed on the screen when the disc loaded to the drive is Video CD disc.
Figure 5:
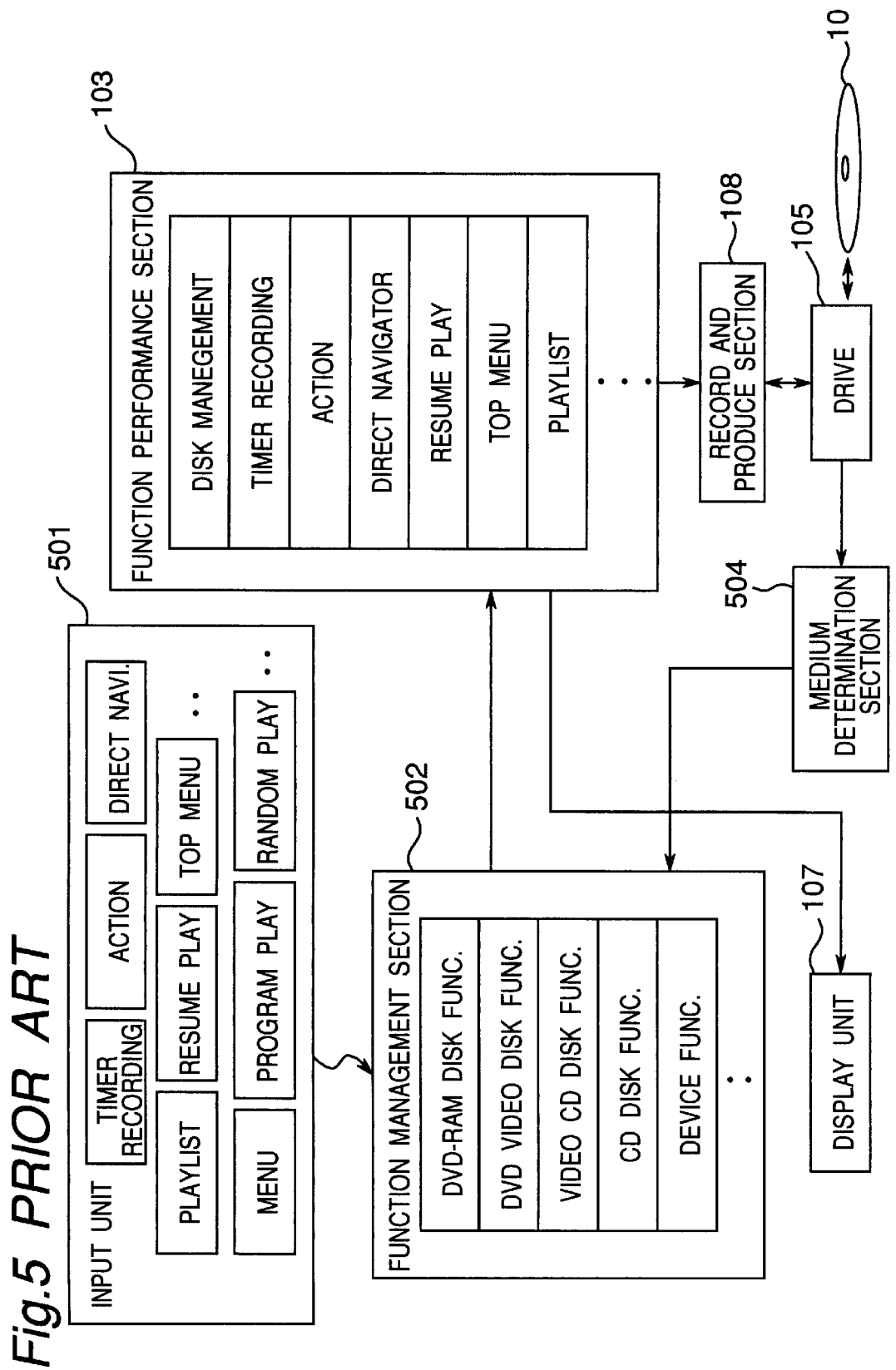
FIG. 5 is a block diagram of an information recording and reproducing apparatus in prior art.

The detail embodiment of the invention is described below in connection with DVD-RAM disc and Video CD disc as an example of the medium with reference to the attached drawings. The invention however can also be applied to the other recordable and readable type disc or read only type disc such as CD-DA or DVD-Video disc in the same manner. FIG. 1 shows a block diagram of the information recording and reproducing apparatus according to the embodiment of the present invention. FIG. 2 shows an example display of the invention displayed on the screen when the disc loaded in a drive is DVD-RAM disc. FIG. 3 shows an example display of the invention presented on the screen when the loaded disc in the drive is DVD-RAM disc which is under the write protection. FIG. 4 shows an example display of the invention displayed on the screen when the disc loaded in the drive is a Video CD disc. The embodiment of the present invention is described below with reference to FIGS. 1 to 4.

The information recording and reproducing apparatus includes an input unit 101, a function management section 102, a function performance section 103, a medium determination section 104, a drive 105, a display control section 106, and a record and reproduce section 108.

The input unit 101 which is for example a remote control unit has a button 101a for calling "TOP WINDOW" function and an arrow button 101b which is used for pointing or selecting a function displayed on a screen of a display unit 107.

Referring to FIG. 1, the medium determination section 104 determines a kind or a state of an information medium 10 which is loaded in a drive 105. The medium determination section 104 examines a difference in thickness of the disc substrate (CD disc is 1.2 mm and DVD disc is 0.6 mm in thickness), based on, for example, focusing operation which uses a thickness difference. The medium determination section 104 also determines a difference in information recording layer from the tracking error signal, for example, it determines whether the disc type is recordable type, write-once type, or readable and recordable type. Information relating to the determination result of the medium 10 is transferred to the function management section 102.

The function management section 102 manages one or more of functions available to each kind or state of the medium 10. The managed functions include a function ("device function") which is available in common with all kinds of media, and a function ("disc function") which is available to a specific kind of the medium 10, as shown in FIG. 1. The functions available in common with all kinds of media, that is, the device functions includes functions of initialization to set time, channel, screen display, acoustics, and the like. When the user pushes a button 101a for a function to display a function list from which the user can select a desired function (this display function is referred to as "TOP WINDOW" function) on the input section 101 such as the remote control unit, a request for the TOP WINDOW function which is selected by the pushed button is transferred to the function management section 102. The medium determination section 104 determines a kind of the medium 10 and outputs the determination result. The function management section 102 outputs a request of the TOP WINDOW function corresponding to the kind of the medium out of the function lists managed in the function management section 102, to the display control section 106, based on the information from the medium determination section 104.

For example, when DVD-RAM disc is loaded to the drive 105, the medium determination section 104 determines that treatable DVD-RAM disc has been loaded, based on the facts that the loaded disc is DVD-RAM medium and that logical structure of the DVD-RAM medium is conformable to DVD-Video Recording format. The information relating to the determination result is transferred to the function management section 102. The function management section 102 outputs an instruction to the display control section 106 to display the functions available to the DVD-RAM disc. The display control section 106 generates data for GUI display including icons or character data according to the instruction from the function management section 102 and transfers the data to the display unit 107. The display unit 107 displays a list screen which is superimposed on a video signal as shown in FIG. 2.

Reference numerals 201 to 208 in FIG. 2 denote buttons which indicate functions which are available or can be performed to the DVD-RAM disc. For example, "DISK MANAGEMENT" with the reference numeral 201 in FIG. 2 denotes a function which can apply a write protection to the disc and formatting the disc. "DIRECT NAVIGATOR" with the reference numeral 204 in FIG. 2 denotes a function which can display the list of recorded programs, and perform the write protection and deletion to each program. "PLAY LIST" with reference numeral 208 denotes a function which can edit or reproduce a desired scene in a program recorded on the disc. "RESUME PLAY" with reference numeral 205 denotes a function which can resume the suspended playback operation.

The user performs a desired function by selecting a button on the input unit 101 such as the remote control unit. For example, when the user selects the button 204 for "DIRECT NAVIGATOR" shown in FIG. 2 via the input unit 101, the selection signal is input to the function management section 102. The function management section 102 outputs a request for "DIRECT NAVIGATOR" function to the function performance section 103. The function performance section 103 instructs the recording and reproducing section 108 to reproduce data for the DIRECT NAVIGATOR function to the DVD-RAM disc, and sends a request for displaying the DIRECT NAVIGATOR screen to the display unit 107.

The medium determination section 104 in this embodiment determines not only a kind of the medium but also a state of the medium. The state of the medium includes, for example, a state that the disc is under write protection or not, a state that the disc is formatted or not, or a state that the disc is vacant or not. The display control unit 106 creates, according to the determination result of the medium determination section 104, a TOP WINDOW screen from which it can be recognized that displayed functions are available or unavailable, and makes the display unit 107 display the TOP WINDOW screen. That is, the display unit displays functions distinctively depending on the state of the medium such that it is possible to distinguish functions which can be performed under the state of the medium from functions which can not be performed under the state of the medium.

An example in which a protected DVD-RAM disc is loaded to the drive 105 is described below. When the protected DVD-RAM disc is loaded to the drive 105, the medium determination section 104 examines the kind of the medium and determines that the protected DVD-RAM disc is loaded, based on the facts that the loaded disc is a DVD-RAM medium, that logical structure of the DVD-RAM medium is conformable to DVD-Video Recording format, and that the protection is applied. The determination result is transferred to the function management section 102. The function management section 102 sends an instruction to the display control section 106 so as to display distinctively V"PLAYLIST CREATION" which is a function available to the protected DVD-RAM disc, and "ACTION", "RESUME PLAY" and so on which are functions not available to the protected DVD-RAM disc (see FIG. 3). The display control section 106 generates data for GUI display including icons or character data according to the instruction from the function management section 102 and transfers the data to the display unit 107. On the display unit 107, as shown in FIG. 3, the list screen which is superimposed on the video signal is displayed. That is, the buttons 201 to 208 are displayed on the display unit 107 such that the button 207 indicating "PLAYLIST CREATION" function which is not available to the protected DVD-RAM disc can be distinguished from the buttons 201 to 206 and 208 indicating functions available to the protected DVD-RAM disc.

Furthermore, the recording and reproduction apparatus according to the invention displays distinctively both functions available and unavailable depending on an operational state of the apparatus. The operational state of the apparatus can be determined by the function management section 102. For example, when the video CD disc is loaded to the drive 105, the display as shown in FIG. 4 is presented on the display unit 107. In FIG. 4, "RESUME PLAY" function is taken as an example of a function which can not be performed to the specific operational state of the apparatus. In order to perform the RESUME PLAY function 403 shown in FIG. 4, it needs to store information relating to a location to resume reproduction (playback) after the first reproduction is finished. Therefore, when the information relating to a location to resume the playback is not stored, the function management section 102 outputs an instruction to the display control unit 106 to display the list screen such that the RESUME PLAY function which is unavailable due to the apparatus state can be distinguished from the other available functions. The display control unit 106 generates and sends information for GUI display such as icons or character data to the display unit 107. As shown in FIG. 4, the button 403 indicating the RESUME PLAY function which is unavailable because the re-start position is not stored is displayed on the display unit 107 such that it can be distinguished from the other buttons 401, 402 and 404 to 106.

It is noted that the function list screen is not limited to a screen provided according to a kind of the medium as shown in FIGS. 2 and 3. For example, the screen may display a list of all functions involved in the present embodiment. The screen further may display a function which is available according to a kind of the recorded medium loaded in the drive 105, a function which is available according to a state of the recorded medium such as a presence of format or write protection, and a function which is available according to a state of the apparatus, distinguished from the functions other than these functions.

It is noted that regarding display positions of buttons on the function list, a button for the device function which is available despite of the kind or state of the medium (for example, timer recording function or initialization function) may preferably be disposed at the same position on the function list regardless of the kind or state of the medium for user friendly purpose. It is also noted that a button for the function having a high frequency of use may preferably be disposed at the center of the list of functions or its vicinity.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2001-072245, filed on Mar. 14, 2001, which is expressly incorporated herein by reference in its entirety.

What is claimed is:

1. An information recording and reproducing apparatus which records or reproduces information signal onto or from an information medium, the apparatus comprising:

a function management section that manages one or more of functions available to each kind or state of the medium;

a determination section that determines at least one of a kind and a state of the medium;

a function selecting section that selects functions which can be performed to the kind or state of the medium from the managed functions according to the determination result of the determination section; and a display control section that generates data for displaying a list of functions selected by the function selecting section.

2. The apparatus according to claim 1, wherein the function management section manages functions which can be performed regardless of the kind of the medium.

3. The apparatus according to claim 1, wherein the display control section generates the data for displaying distinctively the function which can be performed according to the state of the medium and the function which can not be performed according to the state of the medium.

4. The apparatus according to claim 1, further comprising a section that determines a state of the apparatus, wherein the display control section generates data for displaying distinctively the function which can be performed according to the state of the apparatus and the function which can not be performed according to the state of the apparatus.

5. The apparatus according to claim 1, wherein a button for the function available in common with all kinds of media is disposed at the same position on the list of functions despite of the kind or the state of the medium.

6. The apparatus according to claim 1, wherein a button for the function having a high frequency of use is disposed in the vicinity of the center of the list of functions.

7. A method of controlling an information recording and reproducing apparatus which records or reproduces information signal onto or from an information medium, the method comprising:

managing one or more of functions available to each kind or state of the medium;

determining at least one of a kind and a state of the medium;

selecting functions which can be performed from the managed functions according to the determination result; and generating data for displaying a list of selected functions.

8. The method according to claim 7, wherein functions which can be performed regardless of the kind of the medium are managed.

9. The method according to claim 7, wherein, in the list of the selected functions, the function which can be performed according to the state of the medium and the function which can not be performed according to the state of the medium are displayed distinctively.

10. The method according to claim 7, further comprising determining a state of the apparatus, wherein in the list of the selected functions, the function which can be performed according to the state of the apparatus and the function which can not be performed according to the state of the apparatus are displayed distinctively.

11. The method according to claim 7, wherein a button for the function available in common with all kinds of media is disposed at the same position on the list of functions despite of the kind or the state of the medium.

12. The method according to claim 7, wherein a button for the function having a high frequency of use is disposed in the vicinity of the center of the list of functions.

* * * * *